United States Patent [19]

Leitheiser et al.

[11] 4,314,827

[45] Feb. 9, 1982

[54] NON-FUSED ALUMINUM OXIDE-BASED ABRASIVE MINERAL

[75] Inventors: Melvin A. Leitheiser, Stillwater; Harold G. Sowman, Maplewood, both of Minn.

[73] Assignee: Minnesota Mining and Manufacturing Company, Saint Paul, Minn.

[21] Appl. No.: 145,383

[22] Filed: May 13, 1980

Related U.S. Application Data

[63] Continuation-in-part of Ser. No. 53,347, Jun. 29, 1979, abandoned.

[51] Int. Cl.$^3$ ............................................. C04B 35/10
[52] U.S. Cl. ........................................ 51/298; 51/309
[58] Field of Search .................................. 51/309, 298

[56] References Cited

U.S. PATENT DOCUMENTS

| | | | |
|---|---|---|---|
| 1,240,491 | 9/1917 | Saunders et al. | 51/309 |
| 2,768,887 | 3/1956 | Rosenberg | 51/309 |
| 3,079,243 | 2/1963 | Ueltz | 51/298 |
| 3,079,706 | 1/1963 | Sowman | 106/57 |
| 3,175,894 | 3/1965 | Foot | 51/309 |
| 3,181,939 | 5/1965 | Marshall | 51/309 |
| 3,311,482 | 3/1967 | Klinger | 106/65 |
| 3,454,385 | 7/1969 | Amero | 51/298 |
| 3,498,769 | 3/1970 | Coes | 51/298 |
| 3,679,383 | 7/1972 | Hack | 51/309 |
| 3,781,172 | 12/1973 | Pett | 51/309 |
| 3,792,553 | 2/1974 | Schliefer | 51/309 |
| 3,802,893 | 4/1974 | Kiger et al. | 106/62 |
| 3,891,408 | 6/1975 | Rowse | 51/309 |
| 3,916,585 | 11/1975 | Barks | 51/309 |
| 3,941,719 | 3/1976 | Carter | 252/463 |
| 3,966,893 | 6/1976 | Derolf | 423/628 |
| 4,059,417 | 11/1977 | Ilmaier | 51/307 |
| 4,126,429 | 11/1978 | Watson | 51/309 |

FOREIGN PATENT DOCUMENTS

| | | |
|---|---|---|
| 1041853 | 10/1958 | Fed. Rep. of Germany . |
| 292611 | 6/1928 | United Kingdom . |
| 765606 | 1/1957 | United Kingdom . |
| 1176720 | 1/1970 | United Kingdom . |
| 1238446 | 7/1971 | United Kingdom . |

OTHER PUBLICATIONS

Schmid et al., "Oriented Eutectic Microstructures in the System $Al_2O_3/ZrO_2$", *Journal of Materials Science,* 5, 470 (1970).
Badker et al., "Properties of Filaments Sintered From Boehmite Gels", *Transactions and Journal of the British Ceramic Society,* 71, No. 7, 1973 (1972).
Roy, "New Ceramic Materials Produced by Novel Processing Techniques", *Powder Metallurgy International,* 6, No. 1, 25 (1974).
Yoldas, "Transparent Porous Alumina", *American Ceramic Society Bulletin,* 54, No. 3, 286 (1975).
Yoldas, "Alumina Gels That Form Porous Transparent $Al_2O_3$", *Journal of Materials Science,* 10, 1856 (1975).
Badkar et al., "The Mechanism of Simultaneous Sintering and Phase Transformation in Alumina", *Journal of Materials Science,* 11, 1794 (1976).
Yoldas, "Preparation of Glasses and Ceramics From Metal-Organic Compounds", *Journal of Material Science,* 12, 1203 (1977).
Ashbrook, "Directionally Solidified Ceramic Eutectics", *Journal of The American Ceramic Society,* 60, 428 (1977).
Becher et al., "Ceramics Sintered Directly From Gels", invitational brochure published in advance of Fourteenth University Conference on Ceramic Science, Nov. 7-9, 1977.
Becher et al., "Ceramics Sintered Directly From Sol--Gels".
Palmour et al., "Processing of Crystalline Ceramics", (Plenum Press, 1978).

*Primary Examiner*—John A. Parrish
*Attorney, Agent, or Firm*—Cruzan Alexander; Donald M. Sell; Richard Francis

[57] ABSTRACT

The invention relates to synthetic, non-fused, aluminum oxide-based abrasive mineral having a microcrystalline structure of randomly oriented crystallites comprising a dominant continuous phase of α-alumina and a secondary phase, to a method of making the same employing chemical ceramic technology, and to abrasive articles made with the abrasive mineral.

22 Claims, 7 Drawing Figures

NON-FUSED ALUMINUM OXIDE-BASED ABRASIVE MINERAL

REFERENCE TO RELATED APPLICATION

This application is a continuation-in-part of our copending application Ser. No. 53,347, filed June 29, 1979, now abandoned.

TECHNICAL FIELD

The invention relates to synthetic, non-fused, aluminum oxide-based abrasive mineral having a microcrystalline structure of randomly oriented crystallites comprising a dominant continuous phase of α-alumina and a secondary phase, to a method of making the same employing chemical ceramic technology, and to abrasive articles made with the abrasive mineral.

BACKGROUND ART

Alumina is a well known abrasive mineral which is commercially produced by fusion and sintering technology. Attempts to improve the abrasive performance of synthetic alumina have been made with varying degrees of success.

The combination of alumina with other mineral additives such as zirconia in granular abrasive material has been known for quite some time. The combination has been obtained by simply blending granules of the minerals or by forming granules of either a co-fused or sintered blend of minerals.

FUSION AND CO-FUSION TECHNOLOGY

Co-fused blends are typically prepared by heating a mixture of alumina and other oxide precursor above 1800° C. until molten. In the commercially preferred method for making coated abrasive mineral, the molten composition is then poured into so-called "book molds", onto a bed of steel balls or large fabricated pieces of solid mineral, e.g., alumina-zirconia, or into a vessel containing molten salt or low-melting metal and permitted to cool at a controlled rate conducive to the growth of the crystal size desired for the final abrasive product.

The resultant fused mineral is a fine crystal, directionally solidified composite material having characteristic grain boundaries or colonies. Such alumina:zirconia mineral is sold under the trade designation "Norzon" ® by the Norton Company of Worcester, Mass. This mineral has been described as having a fused structure characterized by the presence of rods or platelets of zirconia which are oriented in the direction of heat flow, precluding random orientation, and are of a size dependent on the rate of cooling. Increasing the amount of zirconia in a fused alumina:zirconia toward the 43:57 $ZrO_2$:$Al_2O_3$ (weight ratio) eutectic composition and greatly increasing the cooling rates, decreases the crystal size in the composite and thus improves the abrasive performance of the resulting mineral.

The crystal size of alumina-zirconia grain made by the fusion process is controlled both by the rate of cooling and by the amount of alumina and zirconia in the melt. An alumina-zirconia eutectic composition, for example, yields very fine crystals, while compositions outside of the eutectic yield large crystals of one component embedded in a fine crystal fused eutectic matrix. The crystal size, even for the eutectic composition, is not generally uniform, being fine in those regions that were rapidly cooled and coarser in regions that were cooled more slowly. There is no known method of producing fused abrasive grain having fine, uniform crystal size not substantially affected by variations in the amount of alumina or the rate of cooling. The lack of uniform crystal size necessarily results in a variety of mineral types in the same lot.

Furthermore, a mixture which contains extremely hard alumina particles, such as are obtained by the fusion process, must be crushed to produce the desired abrasive grain size. Such crushing requires expensive heavy-duty equipment, rather long times, much energy and many man hours. The crushed mineral is then graded into the size ranges desired. Any material smaller than the desired sizes can be recovered only by fusing again at a very high temperature.

SINTERING TECHNOLOGY

Compacted blends of powdered alumina and other powdered minerals such as zirconia, magnesia, etc., may be sintered. In a preferred composition comprising alumina and zirconia, the temperature required to achieve sintering is above the monoclinic-tetragonal crystal structure transformation temperature of zirconia. Thus, while sintering temperatures convert much of the zirconia from the monoclinic to the tetragonal crystal lattice, cooling the sintered structure causes the zirconia to revert to the monoclinic structure. This reversion is accompanied by a substantial increase in volume, resulting in internal stresses which weaken the resultant composite.

The internal stresses in sintered alumina-zirconia may be reduced by the addition of certain oxides such as silica and ceria, but the sintered grits or cakes are still typically not so hard as fused alumina-zirconia grains of equivalent compositions. Therefore, although the sintered material is useful in heavy duty, high pressure rough grinding operations, it is not so desirable as fused alumina-zirconia.

Sintering is enhanced by the use of very fine particles, which provide high surface energy and the necessary chemical activity to promote sintering between adjacent particles, imparting strength to the resultant sintered article. Sintering, which appears to be a simple thermal process, is in reality very complicated, involving either simultaneous or sequential changes in surface energy, vaporization-condensation, surface and bulk diffusion, plastic flow, pore shape, size and total pore volume, shrinkage, recrystallization, grain growth and movement of grain boundaries. Other occurrences during the firing process may include solid state reactions, formation of new phases, polymorphic transformations, and decomposition of crystalline compounds to form new phases or gases.

Prior to the sintering process, the removal of binders, water and decomposition of precursor salts may occur. Many of the precursor constituents used in ceramic bodies are carbonates or hydrated compounds, and the removal of the resultant $CO_2$ or $H_2O$ may require temperatures up to 1000° C. In addition to these technical complexities, the difficulty in achieving homogeneity of the starting materials by mechanical mixing is recognized as a separate and serious problem.

Sintering mixed alumina-zirconia powders will not produce a fine crystal size, low void volume abrasive grain, as herein defined, even with the use of additives such as MgO, CaO, $CaF_2$, etc. Without such additives which retard crystal growth to some extent, crystals will grow to relatively large size due to the long time and elevated temperature required for densification. Even with such additives, the resulting grains are not of superior abrasive quality.

CHEMICAL CERAMIC TECHNOLOGY

Chemical ceramic technology involves converting a colloidal dispersion or hydrosol (sometimes called a sol) in a mixture with solutions or other sol precursors to a gel or any other physical state which restrains the mobility of the components, drying, and firing to obtain a ceramic material. A sol can be prepared by precipitation of a metal hydroxide from an aqueous solution followed by peptization, dialysis of anions from a solution of metal salt, solvent extraction of an anion from a solution of a metal salt, hydrothermal decomposition of a solution of a metal salt having a volatile anion, etc. The sol contains metal oxide or precursor thereof and is transformed to a semi-rigid solid state of limited mobility such as a gel by e.g., partial extraction of the solvent. Chemical ceramic technology has been employed to produce ceramic materials such as fibers, films, flakes and microspheres, but not to produce dense mineral for abrasive products.

DISCLOSURE OF INVENTION

This invention provides a calcium ion-free and alkali metal ion-free, dense, non-fused, synthetic, aluminum oxide-based granular abrasive mineral, having a substantially homogeneous microcrystalline structure of randomly oriented crystallites of alumina and a modifying component with the alumina being a dominant continuous phase.

This non-fused mineral is produced with relatively moderate power requirements in contrast to the production of fused mineral, which has very high peak electrical energy requirements to achieve fusion.

The mineral of the present invention comprises (1) a dominant continuous α-alumina phase and (2) a secondary phase substantially homogenously dispersed therein, comprising, on a fired solids basis, a modifying component selected from the group consisting of:

at least 10% by volume zirconia, hafnia, or a combination of zirconia and hafnia;

at least 1% by volume of at least one spinel derived from the reaction of alumina with at least one metal oxide selected from the group consisting of cobalt oxide, nickel oxide, zinc oxide, and magnesia; and at least 1% by volume of at least one spinel as defined above and 1-45% by volume metal oxide selected from the group consisting of zirconia, hafnia and a combination of zirconia and hafnia.

The term "calcium ion- and alkali metal ion-free" means that the mineral contains less than about 0.05% by weight total calcium ion and alkali metal ion, e.g., lithium, sodium, potassium, rubidium, and cesium. The terms "microcrystalline", "crystallites" and "fine crystal size" as used herein mean that the apparent diameter of the crystals being referred to is on the order of 3000 Angstroms or less. The term "dense" is defined as substantially free of voids when viewed under an optical microscope at 500×. The term "dominant" means the largest single phase by volume in the mineral.

The modifying components may be derived from precursors which yield metal oxide and/or other reaction products which form the secondary phase of the abrasive mineral of the present invention. The amount of modifying component of the abrasive mineral is expressed herein on the weight or volume of its calculated fully oxidized form as determined by metal analysis notwithstanding its actual form as introduced or as it exists per se in the mineral.

The method of the present invention produces aluminum oxide-based mineral not heretofore obtainable by such conventional methods as sintering blended powders or fusion. The mineral is a dense, synthetic, aluminum oxide based granular abrasive mineral, having a substantially homogeneous microcrystalline structure of randomly oriented crystallites of alumina and a modifying component with the alumina being a dominant continuous phase. The mineral of the invention has a fine crystal size throughout, notwithstanding variations in the relative amounts of alumina and modifying component. Room temperature electron microscopic examination and X-ray diffraction analysis reveal the modifying component is dispersed in a dominant matrix of microcrystalline alumina, much more nearly homogeneously than that obtained in either a conventionally-sintered compacted blend of powdered alumina and the same modifying component or a co-fused blend thereof.

The method of the invention comprises first providing a calcium ion- and alkali metal ion-free homogeneous mixture in a liquid medium of an alumina source compound such as a colloidal dispersion or hydrosol of alumina and a precursor for the modifying component to provide a concentration in the fired mineral as specified above. The liquid mixture is then converted to a gel and dried, yielding a glass-like, fracturable, porous solid material. (By "glass-like" is meant that the material, at a magnification of 50 times, exhibits brittle and conchoidal fractures and is usually transparent.) The solid material is then fired at a controlled rate, at a temperature of at least 1250° C. but not above the melting temperature of the ultimate mineral, under non-reducing (preferably oxidative) conditions to first permit the escape of fugitive material (e.g., liquids and anions) and then to collapse the porous material to nondestructively convert it to a dense α-aluminum oxide-based mineral.

The liquid medium containing the source compound for alumina and the precursor of the modifying component are thoroughly mixed to provide a homogeneous mixture, which is then gelled. Gelling restrains or limits the mobility of the components, virtually eliminating segregation on a macro scale, thereby retaining the homogeneity of the mixture in the semi-rigid solid state. Blending the components in the liquid state and then limiting their mobility provides, after firing, a very fine crystal size aluminum oxide-based abrasive mineral heretofore unavailable by fusion or conventional sintering processes.

The mixture may be formed into flakes, spheres, rods, granules, etc. before drying, or it may be dried in any convenient form and then crushed or broken to form particles which, after firing, can be employed as abrasive grain.

The very fine crystal size is surprising in view of contrary teachings in the art, which assert that the smaller the original particle size, the larger the grains in the resultant sintered ceramic unless grain growth inhibitors are added, typically not more than 0.25% by weight in the case of MgO in alumina.

In a mineral comprising 70:30 (weight ratio) alumina:zirconia, the alumina forms a matrix containing a zirconia phase characterized by zirconia crystallites having an apparent average diameter less than about 2500 Angstroms substantially uniformly separated, center to center, by about 1000 Angstroms to 3000 Angstroms. Preferred near-eutectic alumina-zirconia mineral compositions have zirconia crystallites with apparent diameters less than about 2500 Angstroms and alumina crystallites with apparent diameters less than about 3000 Angstroms. It should be understood that the relative amounts of alumina and modifying component will affect the average diameter and the separation of crystallites, and the same crystal dimensions may not apply to all of the mineral products of the invention.

The synthetic abrasive minerals of the invention are dense, although the composition and/or process may be modified to increase the void volume for certain purposes. The void volume increases, for example, if the firing temperature is lowered or if appropriate fugitive organic materials are added.

The synthetic aluminum oxide-based mineral of the present invention is characterized by being conchoidally fractured as a result of crushing or breaking the dried material prior to firing, producing particles particularly suited for use as abrasive grain. The abrasive grain may be employed in a conventional manner to produce any of a variety of abrasive products such as coated abrasives, moulded abrasive wheels, low-density nonwoven abrasive products, and the like.

BRIEF DESCRIPTION OF THE DRAWING

The invention is further illustrated by the accompanying drawing, wherein FIGS. 1-6 relate to alumina-zirconia mineral prepared according to the present invention and in which.

DETAILED DESCRIPTION

Figure 7:
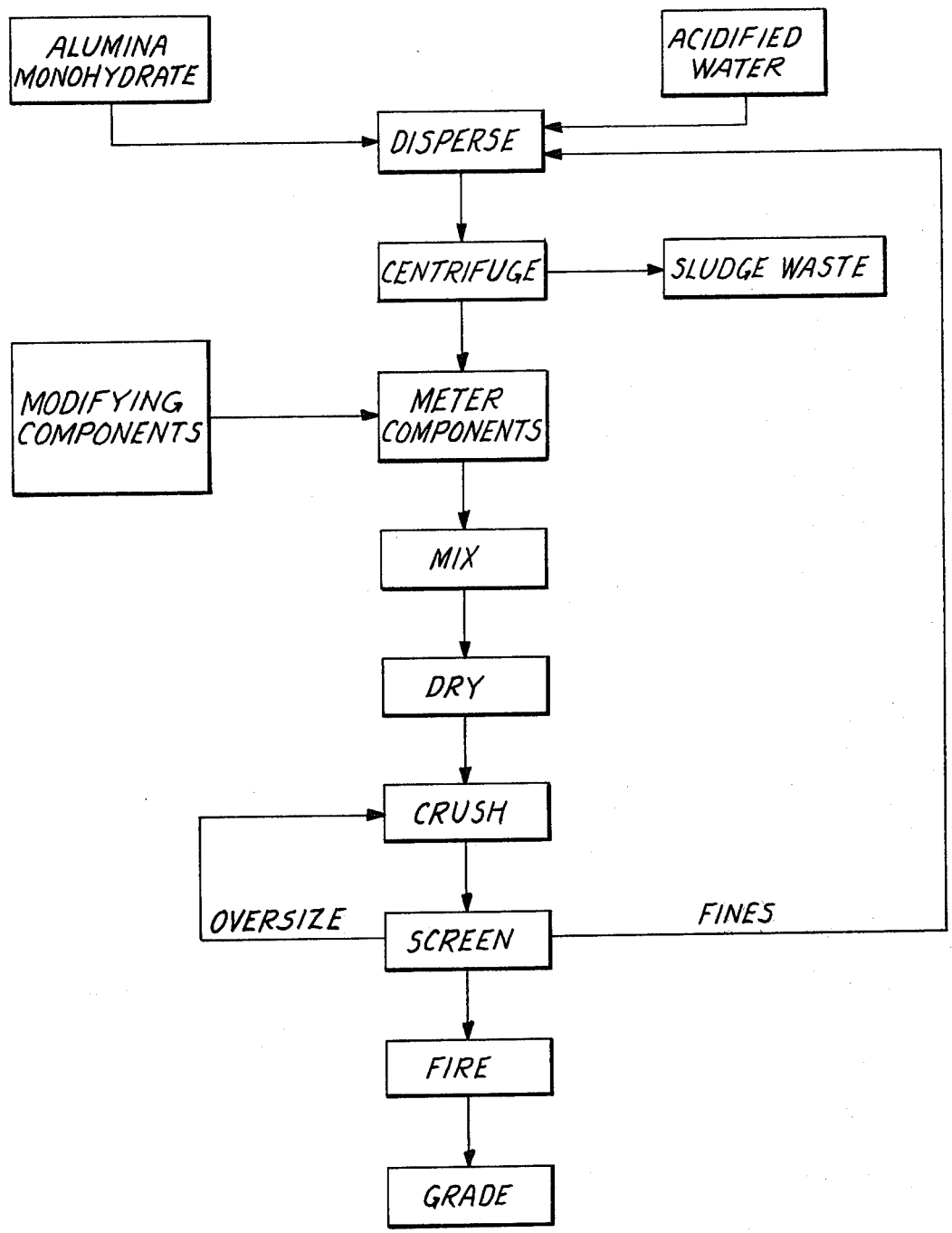
FIG. 7 is a flow chart showing the preferred method of making the mineral of the invention.

As shown in FIG. 7, the preferred method of the present invention involves dispersing alumina monohydrate into acidified water to produce a relatively stable hydrosol or colloidal dispersion* of peptized alumina monohydrate; removing undispersed particles, e.g., by centrifuging; mixing the resultant dispersion with modifying component precursor, e.g., zirconyl acetate or other alkanate; permitting the mixture to gel, drying the gel to a glass-like state; crushing the dried gel to a desired particle size; and firing the crushed material at a temperature of at least 1250° C. but less than its mineral melting temperature to produce a random intimate mixture of fine crystal size alumina and modifying component.

*The phrase "relatively stable hydrosol or colloidal dispersion" refers to dispersed aqueous mixtures of fine particulate materials which remain in suspension for prolonged periods of time.

The preparation of alumina monohydrate is well known in the art. A commercially available α-alumina monohydrate which is useful in the present invention is a byproduct of the Ziegler process for making primary alcohols and is sold under the trade designations "Dispal" ® M, "Dispural" ®, and "Catapal" ® SB. These products are characterized by exceptional purity, high surface area (e.g., 250-320 m²/g) and very small crystallite size (approximately 50 Angstroms in diameter). Alumina monohydrate may also be obtained by the hydrolysis of aluminum alkoxides.

Monoprotic acids or acidic compounds which may be employed to peptize the alumina monohydrate and thereby form the hydrosol, or colloidal dispersion, include acetic acid, hydrochloric acid and nitric acid. Nitric acid appears to provide the greatest stability in the hydrosol or colloidal dispersion of alumina monohydrate. That is, there is little or no settling of alumina when peptized with nitric acid. Acetic acid seems to provide the least stability, although it is still useful. Multi-protic acids such as sulfuric and phosphoric should be avoided, since they very rapidly gel the alumina monohydrate, making it difficult to mix with the modifying component precursor. The amount of acid required may be determined by conductometric titration to the apparent equivalence point and is directly related to the surface area of the alumina. The pH of the peptized sol will generally be on the order of 1-2 although it may increase to about 3 upon standing. Insufficient acid may inhibit dispersion of the particles. Excess acid may cause the mixture to gel more rapidly upon the addition of the modifying component precursor, making mixing more difficult, but will not adversely affect the product if homogeneity is achieved.

The concentration of alumina monohydrate in the hydrosol or colloidal dispersion may vary widely, from a few percent by weight to 40% or higher. Mixtures prepared with hydrosols or colloidal dispersions containing less than 5% by weight alumina monohydrate when blended with the modifying component precursor solution generally do not gel without preliminary dehydration of the mixture. Concentrations above 30% alumina monohydrate tend to gel prematurely and therefore are somewhat more difficult to mix with the modifying component source compound. The preferred concentration of alumina monohydrate is therefore from about 15% to about 30% by weight.

During firing, the modifying component precursors utilized in this invention yield metal oxides, some of which may react with alumina to form a spinel. Spinels are produced by the reaction of alumina and oxides of such metals as cobalt, nickel, zinc and magnesium. Zirconia and hafnia do not form spinels with alumina. The precursors for modifying components preferably have a fugitive monovalent organic or inorganic anion. Some precursors having multivalent anions, e.g., carbonates and oxalates, may be useful where they do not cause premature gelation which precludes homogeneous mixing or when their decomposition does not cause excessive bubbles or porosity in the gel and resultant mineral. Such multi-valent anion-containing compounds are particularly useful for promoting the gelation of dilute sols. Useful precursors for the modifying component include zirconyl alkanates and zirconium nitrate, which yield zirconia on firing; magnesium nitrate, acetate, chloride and hydroxide, which yield magnesia; nickel nitrate and acetate which yield nickel oxide; zinc nitrate and acetate which yield zinc oxide; and cobalt nitrate, which yields cobalt oxide. It should be understood that the foregoing list of exemplary precursors is not exhaustive, and other compounds may also be used. Additionally, a single precursor may provide more than one modifying component. Certain metal oxides (for example magnesia) may be dissolved directly in the alumina-containing acid medium. It should also be understood that many precursors may contain minor amounts of either impurities or intentionally added components which, in many cases, do not interfere with the production of useful mineral. For example, zirconium compounds generally contain as much as 1-2% hafnium as an impurity, which does not have a deleterious effect on the final abrasive mineral.

Useful abrasive mineral is produced when other metal oxides or precursors thereof are included in addition to the modifying components set forth above. Examples of such mineral include a secondary phase comprising zirconia and samaria (the latter being obtainable from samarium acetate or nitrate, for example) and alumina-magnesia spinel with titania, ceria, zirconia and mixtures thereof.

Preferred modifying component precursors are the zirconyl alkanates, especially zirconyl formate or zirconyl acetate, which may be obtained from Alpha Division of Ventron Corporation and from Harshaw Chemicals Company. The empirical formula given for zirconyl alkanates in trade literature from the suppliers is $HZrOOH-(OOCR)_2$, where R is H or $CH_3$. Zirconyl acetate is the most preferred zirconyl alkanate because it has a long storage life and it is presently readily available. Other zirconyl alkanates may also be useful.

Zirconyl acetate is a water-soluble solid which may contain sodium ion. The presence of calcium ion or alkali metal ions in the alumina-zirconia mineral of the present invention tends to make it undesirably porous, soft and friable, perhaps because of the formation of $\beta$-alumina. Therefore, where the alumina-zirconia mineral of the present invention is to be employed as abrasive grain, steps should be taken to remove substantially all but trace quantities (less than about 0.05% by weight) of calcium ion, sodium ion and any other alkali metal ions. Excess calcium ions and alkali metal ions may be removed either by passing the zirconyl alkanate solution through a column containing a cation exchange resin or by mixing the solution briefly with such a resin.

The alumina monohydrate hydrosol dispersion is mixed with the zirconyl alkanate (or other precursor for the modifying component) to provide a homogeneous mixture which sets to a gel. The amount of time required to form the gel depends upon the ratio of precursor ingredients to each other in the solutions or dispersions thereof, the solids content of each, the acid content and the size of the colloidal particles. Some low solids content mixtures will not gel unless they are first partially dehydrated.

The alumina monohydrate hydrosol dispersion and modifying compound precursor solution may be mixed at any convenient temperature so long as they do not solidify, gel, or evaporate solvent too rapidly. Typical mixing temperatures are in the range of 10° C. to 80° C., preferably from 30° C. to 60° C.

The mixing equipment, which should provide a homogeneous blend of the two liquids, may be either batch or, preferably, continuous. The most preferred system involves pumping the two liquids continuously and simultaneously into a small volume, intensive action, in-line mixer where they are quickly combined, thoroughly mixed and ejected.

The resultant gel is then dried at a temperature and pressure which will not cause the water to boil or froth. Drying typically yields chunky pieces of the gel due to its low cohesive strength and considerable shrinkage. If the mineral being prepared is to be employed as abrasive grain, the dried material should provide solid chunks larger than the abrasive grain desired.

Drying conditions which cause the gel to foam or produce voids or froth should be avoided if substantially void-free, dense, fired product is desired. Preferably, drying is carried out slowly with little or no agitation. The preferred method involves spreading the gel to a thickness of approximately 2-3 cm and allowing it to dry for approximately one day, or until substantially all of the free water (i.e., water which is not chemically bound) is removed from the gel and a particulate, glass-like material remains. The individual pieces of dried gel appear to be solid and dense, but they are actually brittle and may be crushed by finger pressure.

Figure 4:
FIG. 4 is an optical photomicrograph of air-dried particles taken at a magnification of 30×.

FIG. 4 shows an optical photomicrograph of air dried material. X-ray diffraction examination of the dried gel reveals the same diffraction pattern as in the wet gel. The dried gel preferably should have sufficient porosity to permit rapid firing. So long as it is not heated above 150° C., the dried gel is completely dispersible in water to form a sol which can be recycled. This feature provides an economic advantage, since the dried particulate material that is too fine to use as abrasive grain may be easily recycled.

The dried material is then crushed to reduce the particle size to that desired for abrasive grain. Since there will typically be 20%-40% shrinkage by volume on firing, the crushed material should be slightly larger than the desired grain.

Since the material is quite soft and brittle, crushing is relatively easy and can be accomplished by any convenient crushing device, preferably a hammer mill or ball mill. Consideration should be given to maximizing the yield of usable size range and producing the desired grain shape. The crushed material may be graded to remove those sizes which will result in useful abrasive grain and the remaining sizes may be recycled. The larger unusable sizes may be recrushed and the smaller unusable sizes may simply be redispersed in water.

It should be noted that, due to its large surface area, the glass-like particulate material will absorb large quantities of water vapor and other gaseous materials from the atmosphere, if allowed to cool at room temperature under ambient conditions after drying. Absorbed materials are generally driven off by the time the firing temperature reaches 150° C. Optimum firing conditions are dependent on the specific compositions but may be readily determined by one skilled in the art, once apprised of the present disclosure.

The dried gel or glass-like particulate material is heated in the presence of oxygen (e.g., in air) in an operation which is referred to herein as firing. Heating drives off chemically bound water and residues of the acids used to make the alumina sol, decomposes and oxidizes the organic zirconyl alkanate to zirconium dioxide and expels the fugitive reaction products, converts the alumina and zirconia to the desired crystal structure, and collapses the composite, essentially eliminating voids and producing dense, solid alumina-zirconia mineral comprised of an intimate mixture of randomly oriented small zirconia and alumina crystallites. Care should be taken in firing to avoid collapsing the composite before all of the volatile material has been expelled and to provide an adequate supply of oxygen during the oxidation of the zirconyl alkanate to zirconium dioxide and gaseous products. Care must also be taken to increase the temperature slowly enough to permit the volatile material to escape as it is generated without causing undue internal pressure within the composite being heated. The zirconyl alkanate will carbonize or char near 250° C. and oxidize to zirconium dioxide under 450° C. At approximately 600° C., essentially all of the chemically bound water will have been released from the hydrated alumina. The temperature at which the acid residues will be driven off depends, of course, upon the particular acid employed but is generally below about 1000° C.

Firing is continued until all mineral has reached a temperature of at least 1250° C. and, more typically, 1300° C. At this point the porous, high surface area structure of the dried gel has collapsed to form individual free-flowing particles of a solid, dense mass of alumina-zirconia, and various transformations in the crystal structure of the alumina and the zirconia have taken place.

The transformation of the alumina and zirconia into the various crystal structures is quite complex and not completely understood. The first identifiable zirconia crystallographic species obtained during firing the dry gel is identified by X-ray diffraction as the tetragonal crystal structure. As the firing temperature is increased, X-ray diffraction examination at room temperature of the resultant mineral may show the presence of some monoclinic zirconia. The amounts of conversion depends upon the zirconia content, firing rate, firing conditions and the type of equipment used. If fired at 1300° C. for several hours, high zirconia content, e.g., on the order of 40%, produces a crystal structure in the final product which will be predominantly monoclinic with minor amounts of tetragonal*. However, if the zirconia content is low, e.g., on the order of 15%, the predominant crystal structure will be tetragonal, with minor amounts of monoclinic. Under these conditions, essentially all of the alumina will have been converted to the alpha crystal structure.

*May include some cubic zirconia, if X-ray diffraction lines are diffuse.

The alumina can also exhibit a number of crystalline structures or forms and progresses through a series of such structures as the temperature is increased. After 3 to 5 hours at 1250° C. or more, essentially all of the alumina is converted to the alpha form, which is the crystal structure of the alumina generally employed as abrasive grain. It has also been found, however, that mineral suitable for use as abrasive grain can be prepared by heating the product to a temperature in excess of 1250° C. for but a few minutes, even though the transformation of the alumina to the alpha form has not been completed.

The introduction of magnesia into the alumina-zirconia system produces an identifiable spinel crystalline structure in addition to the alumina and zirconia crystallites. Additionally, if a magnesia precursor is directly introduced into the alumina sol, the final product contains an identifiable spinel in addition to the alumina crystallites.

The rate at which the temperature may be increased to accomplish the purposes set forth above depends upon several factors, including the chemical composition (e.g., the alumina-zirconia ratio) of the mineral, the size of the particle and the accessibility of oxygen. If firing is carried out in a static bed, the depth of the bed, heat transfer and air supply will also be factors. If the mineral is agitated and exposed to air, the firing time may be reduced substantially; however, because the mineral is to be employed in the form of abrasive grains, agitation during firing should be controlled to avoid dulling or rounding the particle edges, particularly during the early stages, when they are still friable. Firing under static conditions typically requires several hours. Firing under dynamic conditions may be accomplished within a matter of minutes. The rate of temperature increase should be controlled so that the volatile matter can escape from the interior of the mineral without generating undue internal pressures which crack the mineral. Some experimentation may be required to determine the optimum firing conditions for a particular situation.

Prolonged firing at very high temperature will permit unwanted crystal growth and hence should be avoided. For example, coarse crystal growth has been noted in mineral which has been heated at 1650° C. for several hours. While not so desirable as mineral having finer crystal structure, this mineral still has utility as abrasive grain. After firing, the mineral may be cooled quite rapidly to room temperature without damage. The preferred mineral has a Knoop hardness value (500 gram load) in the range of about 1200 to 1800 kg per mm$^2$, hardness generally being directly related to the α-alumina content.

Figure 1:
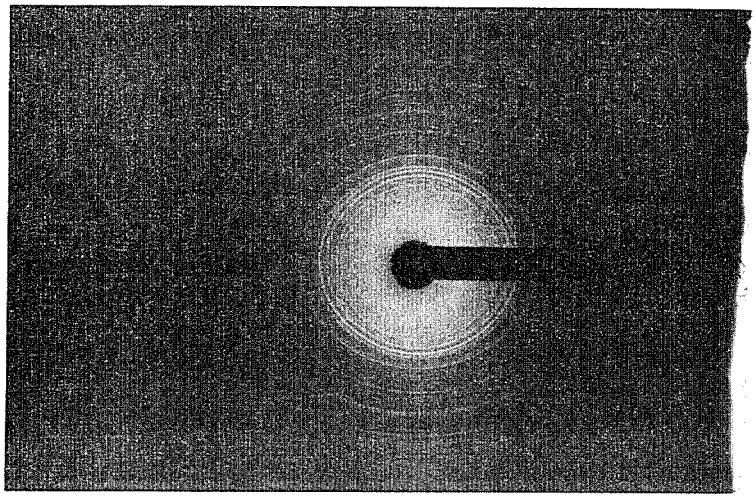
FIG. 1 is a Laue X-ray photograph.
Figure 2:
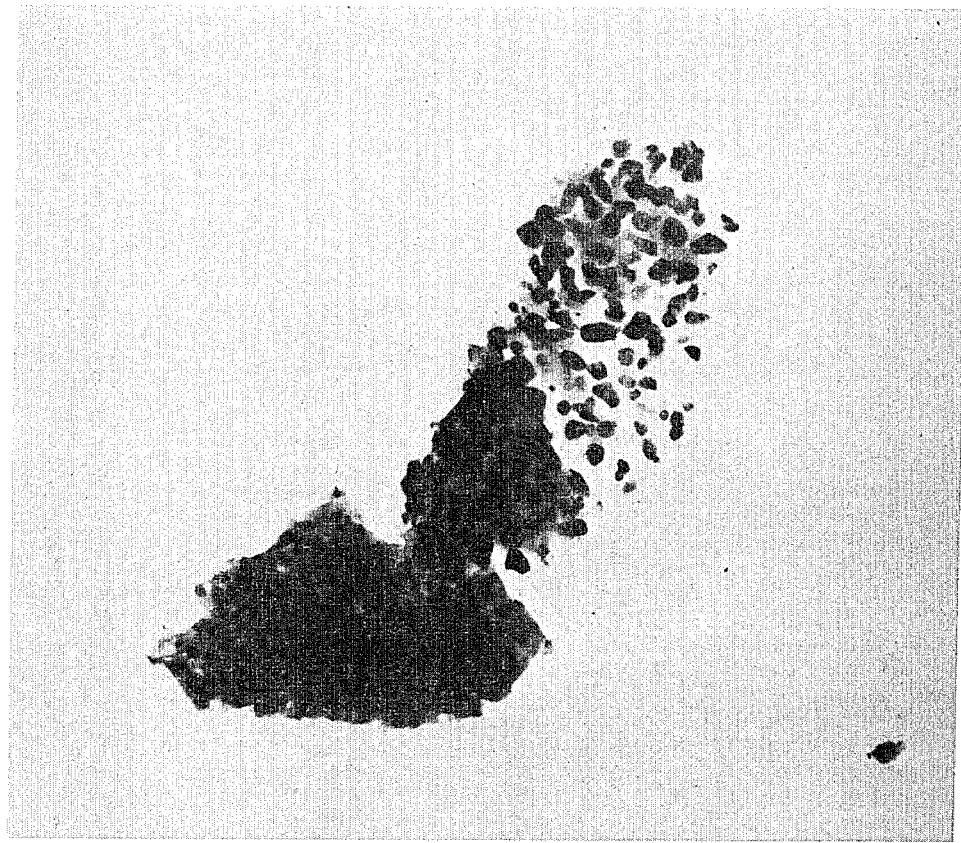
FIG. 2 is a transmission electron photomicrograph taken at a magnification of 33,000×.
Figure 3:
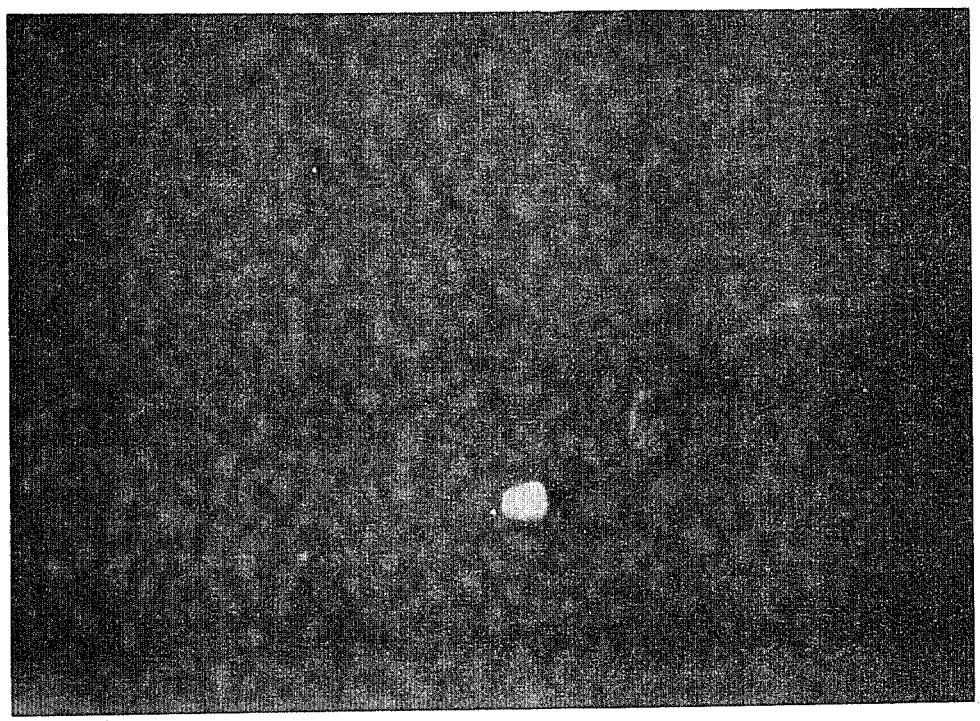
FIG. 3 is a photomicrograph taken with a scanning electron microscope at a magnification of 30,000×.

FIG. 1, a photograph of a Laue X-ray pattern of applicants' mineral containing 64:36 (weight ratio) alumina:zirconia, reveals a virtual lack of orientation in the alumina-zirconia mineral, and indicates a random orientation of both the zirconia and alumina crystallites. FIG. 2, a transmission electron photomicrograph, confirms this analysis, showing dark crystallites of zirconia randomly disposed in grey α-alumina, FIG. 3 is a scanning electron microscope photomicrograph, magnified 30,000 times, of a petrographically prepared sample of the mineral of the invention, which further confirms the random orientation and shape of the zirconia crystallites, shown as lighter spots, in the darker α-alumina. (The white spot near the center of the photomicrograph is an extraneous particle employed only to focus the microscope and serves only to confirm the focus and to show that the outlines or edges of the crystallites are actually indistinct.)

Figure 5:
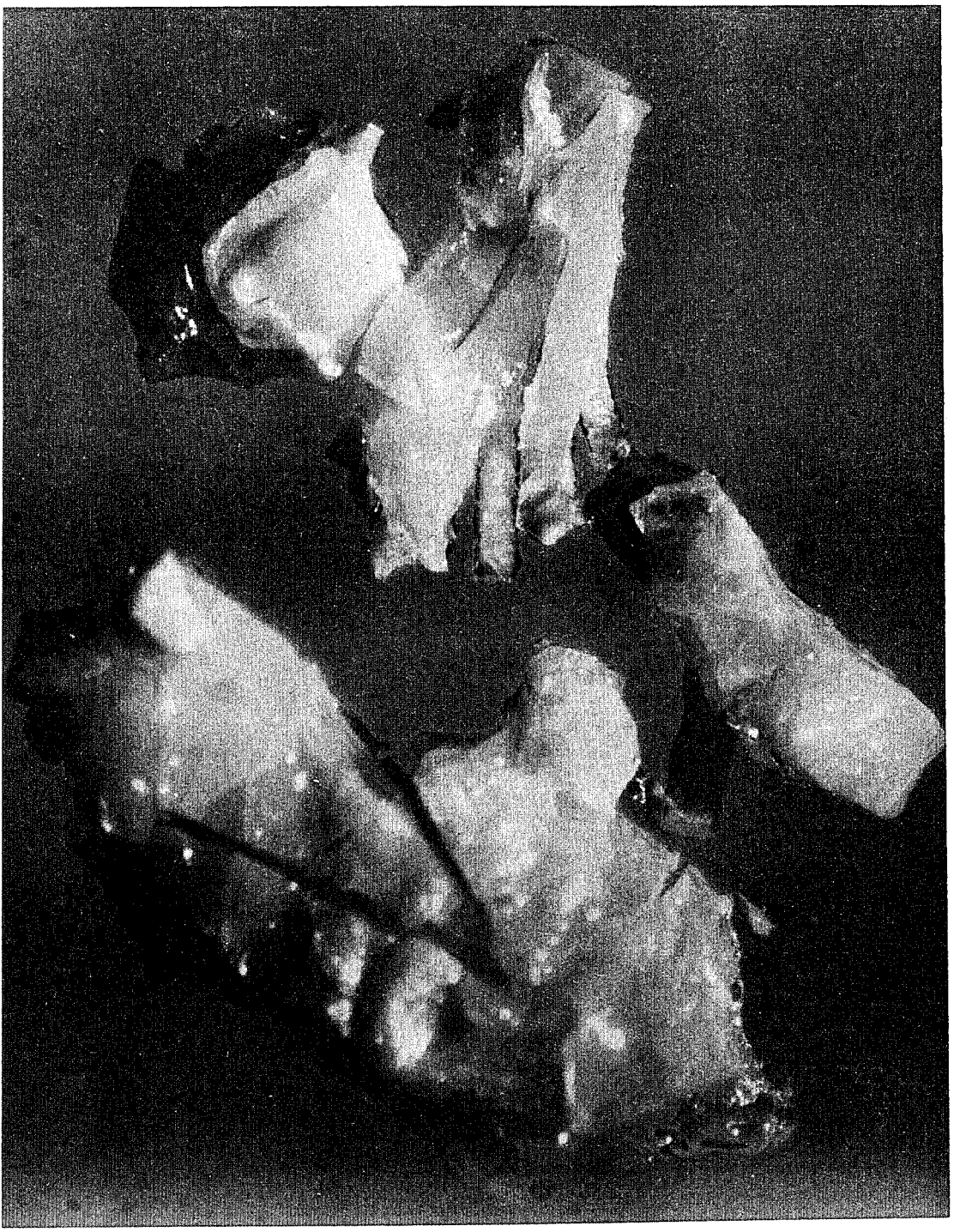
FIG. 5 is a photomicrograph of particles of gel which have been dried and prefired at 1000° C., taken with an optical microscope at a magnification of 30×.
Figure 6:
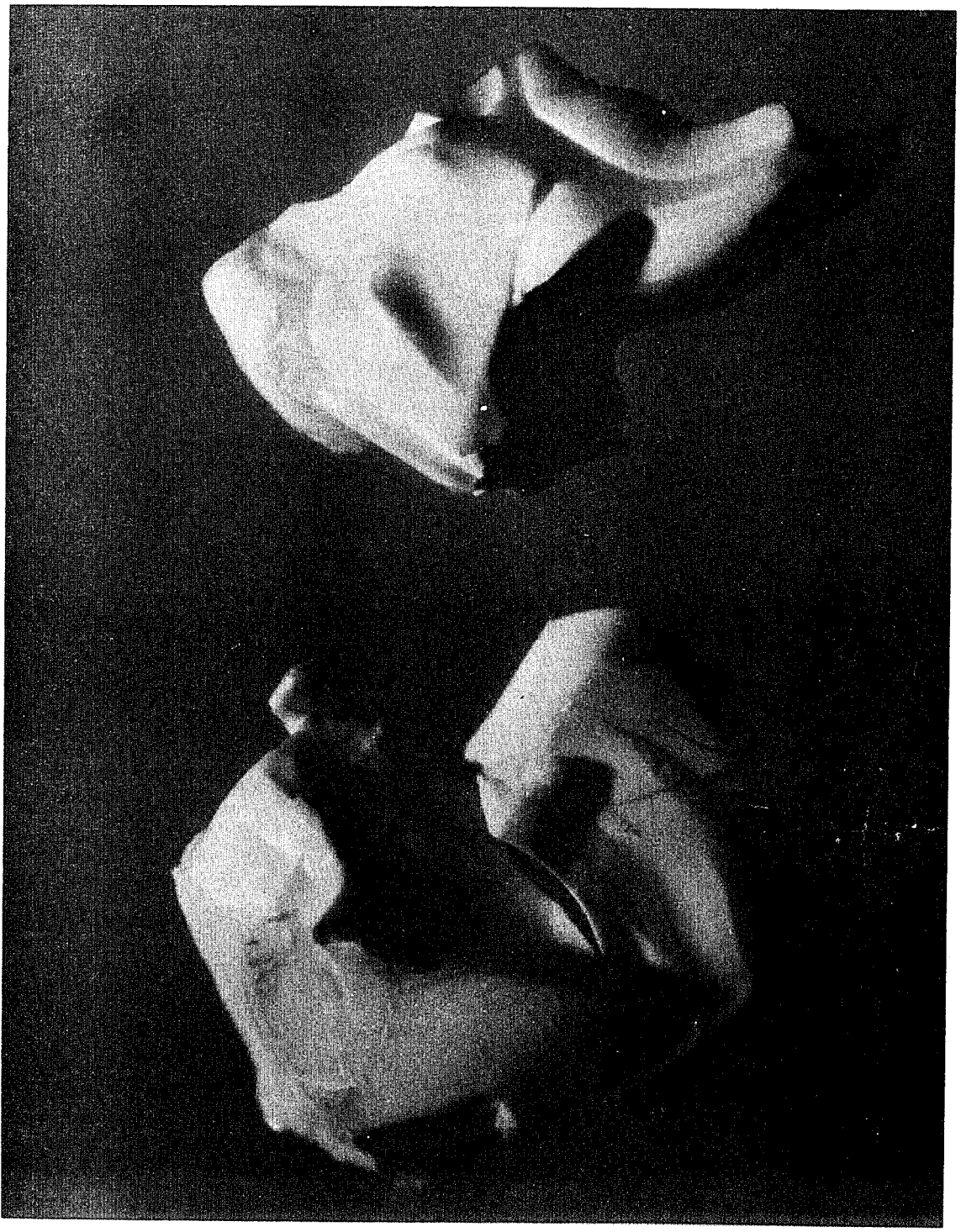
FIG. 6 is a photomicrograph of particles, taken with an optical microscope at a magnification of 30×.

FIG. 5 is an optical photomicrograph of material prefired at 1000° C., showing the conchoidal surface. FIG. 6, which is a photomicrograph of the fired product taken with an optical microscope, shows the conchoidal surface of the alumina-zirconia mineral of the invention is still present. While the mineral shown in FIG. 6 is opaque, it should be noted that it may also be transparent to visible light if shorter firing times are employed. The ability to produce a transparent mineral from the gel is further evidence of the very fine crystallite size and freedom from gross inhomogeneity or defects of the mineral of this invention. The fired mineral, whether transparent or opaque, exhibits conchoidal behavior, much like glass, when viewed at low magnification.

The addition of magnesium oxide, even as little as about 0.2% to about 20% by weight, has been found to increase the hardness, toughness and grinding ability of the resulting mineral product. The magnesium oxide may be introduced by dissolving or reacting a precursor such as magnesium nitrate or magnesium oxide in the zirconyl alkanate solution prior to adding it to the alumina hydrosol.

A preferred aluminum oxide-based abrasive mineral according to the present invention comprises, on an oxide equivalent weight basis, about 40%–99% (preferably 50%–98%) α-alumina, about 0%–60% (preferably 0%–45%) zirconia and about 0%–25% (preferably 1%–12%) magnesia as spinel formed by reaction of magnesia and alumina. On a volume basis in alumina-zirconia, this corresponds to about 49%–90% (preferably 59%–98%) alumina. For mineral formed from alumina and MgO, the volume of α-alumina is 11% to 99%, preferably 55% to 96%. The volume percent ratio of other mineral compositions may be calculated from the weight percentage and density of the phases known to be present.

The particulate mineral may be employed as loose grain or used to make coated abrasive products, grinding wheels, nonwoven abrasive products and other products where abrasive granules are typically employed.

EXAMPLES

The invention is further illustrated by reference to the following nonlimiting examples, wherein all parts and percentages are by weight, unless otherwise specified. It should be noted that the compositions of the examples are summarized in Tables I and V.

EXAMPLE 1

Water, 16 N nitric acid and alpha alumina monohydrate powder sold under the trade designation "Dispal" ® M were charged into the 6-liter stainless steel mixing vessel of a "Waring" industrial-type blender and dispersed therein at high speed for 30 seconds. The dispersion was then passed through a continuous centrifuge which generates 3000 times the force of gravity to remove the undispersed solids. The resultant dispersion and 50% zirconyl acetate aqueous solution were metered through an in-line blender to produce a mixed dispersion which was collected in 5 cm × 46 cm × 61 cm aluminum trays, wherein the mixed dispersion gelled in less than 5 minutes. The gel was dried in a forced air oven at 90° C. until it contained less than 10% volatiles, and was composed of granules up to about 0.5 cm in diameter. The granules were crushed with a 20 cm hammer mill, screened, and the 0.5 mm to about 5 mm average particle size range was retained for firing. The particle fraction finer than 0.5 mm in average diameter was retained for Example 3.

The screened crushed material was then transferred to non-reactive 5 cm × 10 cm × 20 cm refractory trays and fired in an oxidative atmosphere to 550° C. at a rate of temperature increase of 100° C./hour. The material was held at 550° C. for 20 hours, by which time it had achieved a uniform translucent yellow color. The temperature was then raised to 1350° C. at a rate of 200° C./hour and held at 1350° C. for 5 hours. The furnace was then allowed to cool to room temperature and the resultant fired material was removed. The fired material consisted of opaque white granules composed of 60% alumina and 40% zirconia.

The following Examples 2–10 are substantially the same as Example 1 except for the changes noted.

EXAMPLE 2

Firing was carried out for much shorter firing times than those described in Example 1. The crushed dried gel was fed into the end of a 700° C. kiln, which was a 13-cm diameter 1.2-meter mullite tube having a 30-cm hot zone inclined at 3° C. with respect to the horizontal, and rotated at 7 rpm, residence time being about 5 minutes. The fired product from the 700° C. kiln was fed directly into a 1350° C. kiln of similar construction and placement, residence time being about 1 minute. The product was cooled to room temperature in about 5 minutes, producing transparent mineral. An opaque mineral was also produced using the same procedure except that the residence time in the 1350° C. kiln was about 3 minutes.

EXAMPLE 3

The dried gel fines which resulted from the crushing as in Example 1 were redispersed in water by adding 1 kg fines to 3 kg water and mixing in the Waring blender. The resulting dispersion was transferred to the aluminum trays, where it set to a gel in approximately 5 hours.

EXAMPLE 4

MgO (reagent grade powdered MgO obtained from the Mallinckrodt Chemical Co.) was dispersed in and reacted directly with the zirconyl acetate solution. The dispersion and solution were metered through the in-line blender, dried, crushed and fired as in Example 1.

EXAMPLE 5

The rate of metering the dispersion and solution was adjusted to produce a final composition of 80% $Al_2O_3$ and 20% $ZrO_2$.

EXAMPLE 6

The MgO was reacted directly with the zirconyl acetate solution.

EXAMPLE 7

The metering of the dispersion and solution was adjusted such that a 70% $Al_2O_3$–30% $ZrO_2$ product was prepared.

EXAMPLE 8

The MgO was reacted directly with the zirconyl acetate solution.

EXAMPLE 9

Acetic acid was used as the acid source, requiring a considerably more dilute dispersion.

EXAMPLE 10

$MgCl_2.6H_2O$ was dissolved in the zirconyl acetate solution.

EXAMPLE 11

This example is the same as Example 2 except that the 50% zirconyl acetate solution was diluted to 25% with water and the magnesium nitrate was dissolved in it. The zirconia crystallites had apparent diameters of less than 300 Angstroms as determined by transmission electron microscopy.

EXAMPLE 12

This example is the same as Example 2 except that the magnesium nitrate was dissolved in water and the resulting solution was added to the alumina sol.

EXAMPLE 13

This example is a control which is the same as Example 1 except that the zirconyl acetate was omitted, yielding a product which was 100% alumina. Under optical microscopic (750×) examination of polished and etched samples of fired particles, no crystal structure was observable, showing that the crystal size of α-alumina was apparently finer than that of the modified mineral of this invention. Line broadening of X-ray diffraction patterns also indicates that the crystallite size of this 100% α-alumina was smaller than that of the modified alumina fired under the same conditions.

Each of the batches of abrasive grain made as described in Examples 1 through 13, 21 and 41 was screened to yield three common grain sizes and bonded to filled rayon or cotton drills cloth to make coated abrasive sheet material using conventional coated abrasive making procedures. The make adhesive consisted of a conventional solution containing 48% phenol-formaldehyde resin solids and 52% calcium carbonate filler. The mineral weights, shown in Table III, were adjusted to provide a relatively constant volume of mineral for all products having the same grain size. The size adhesive consisted of a conventional solution containing 32% phenol-formaldehyde resin and 68% calcium carbonate filler. The make resin was precured for 75 minutes at 88° C. and the size resin for 90 minutes at 88° C. The coated abrasive product was final cured at 100° C. for ten hours. The coating was done using conventional techniques.

The coated abrasive sheets were converted to 7.6 cm × 335 cm endless abrasive belts and tested on a constant load surface grinder, abrading the 2½ cm × 18.4 cm face of a 1018 steel workpiece with successive 30 second grinding passes, weighing and cooling after each pass, employing the pressure, belt speed and workpiece feed rate set forth in Table IV. The workpiece was oriented with its long dimension vertical and, during abrading, was moved vertically in a 18.4 cm path in a cycle from its original position and back again for the number of cycles shown in Table IV. Grinding results are shown in Table II.

As can be seen from the results shown in Table II, the abrasive grain of the present invention grinds far better than conventional aluminum oxide and substantially equivalent to or much better than commercially available co-fused alumina-zirconia mineral.

TABLE I

COMPOSITION OF THE EXAMPLES

| Ex. No. | Alumina[1] (g) | Acid (ml) | 50° C. $H_2O$ (ml) | 50% Zirconyl Acetate Solution (g) | MgO (g) | Dried Gel (g) |
|---|---|---|---|---|---|---|
| 1 | 1020 | 43 | 3000 | 2094 | — | — |
| 2 | 1020 | 43 | 3000 | 2094 | — | — |
| 3 | — | — | 3000 | — | — | 1000 |
| 4 | 1020 | 43 | 3000 | 2094 | 41 | — |
| 5 | 1020 | 43 | 3000 | 785 | — | — |
| 6 | 1020 | 43 | 3000 | 775 | 41 | — |
| 7 | 1020 | 43 | 3000 | 1346 | — | — |
| 8 | 1020 | 43 | 3000 | 1316 | 41 | — |
| 9 | 340 | 32 | 3000 | 690 | — | — |
| 10 | 1020 | 43 | 2500 | 1280 | 40[2] | — |
| 11 | 1020 | 43 | 3000 | 175 | 44[3] | — |
| 12 | 1020 | 43 | 3000 | — | 24[4] | — |
| 13 (Control) | 1020 | 43 | 3000 | — | — | — |

[1] Alpha alumina monohydrate sold under the trade designation "Dispal" M.
[2] From 204g $MgCl_2 \cdot 6H_2O$
[3] From 282g $Mg(NO_3)_2 \cdot 6H_2O$
[4] From 154g $Mg(NO_3)_2 \cdot 6H_2O$

TABLE II

| | COMPOSITION AND PHYSICAL PROPERTIES | | | | | GRINDING RESULTS Amount of Steel Removed ($cm^3$ metal/$cm^2$ coated abrasive wear path) | | |
|---|---|---|---|---|---|---|---|---|
| | | | | Knoop Hardness (500 g load) | | Abrasive Grade | | |
| Ex. No. | % $Al_2O_3$ | % $ZrO_2$ | % MgO | $Kg/mm^2$ | | 100[b] | 50[c] | 36[d] |
| 1 | 60 | 40 | — | 1328 s[a] | 85 | 0.137 | 0.546 | 0.864 |
| 2 | 60 | 40 | — | 1357 s | 98 | 0.130 | — | — |
| 3 | 60 | 40 | — | 1320 s | 63 | 0.122 | — | — |
| 4 | 58 | 39 | 3.0 | 1556 s | 128 | 0.155 | — | 1.069 |
| 5 | 80 | 20 | — | 1490 s | 102 | 0.102 | — | 0.617 |
| 6 | 77 | 19 | 4.0 | 1581 s | 127 | 0.130 | — | — |
| 7 | 70 | 30 | — | 1463 s | 57 | 0.142 | 0.668 | 0.848 |
| 8 | 68 | 28.5 | 3.5 | 1530 s | 113 | 0.165 | 0.792 | — |
| 9 | 57 | 43 | — | 1296 s | 74 | — | — | 0.918 |
| 10 | 68.5 | 28 | 3.5 | 1476 s | 45 | 0.130 | — | — |
| 11 | 90 | 5 | 5 | 1750 s | 63 | 0.218 | 0.671 | — |
| 41[e] | 90 | 5 | 5 | — | — | — | 0.644 | — |
| 12 | 97 | 0 | 3 | 1570 s | 126 | 0.213 | 0.756 | — |
| 21[e] | 94 | 0 | 6 | — | — | — | 0.899 | — |
| 13 (Control) $Al_2O_3$ | 100 | 0 | 0 | 790 s | 216 | — | — | 0.001 |
| (Control) Fused AZ[f] | — | — | — | — | — | 0.064 | 0.122 | 0.323 |
| (Control) | — | — | — | — | — | 0.124 | 0.615 | 1.052 |

[a] "s" is standard deviation;
[b] Avg. Dia. 175 microns;
[c] Avg. dia. 430 microns;
[d] Avg. dia. 650 microns;
[e] For composition, see Table V;
[f] Alumina-Zirconia

TABLE III

COATED ABRASIVE

| | | Mineral Weights ($g/cm^2$) | | |
|---|---|---|---|---|
| Abrasive Grain (Ex. No.) | Backing: Abrasive Grade: | "X" Wt. Rayon 100 | "Y" Wt. Cotton 50 | "Y" Wt. Cotton 36 |
| 1 | | 0.038 | 0.078 | 0.116 |

TABLE III-continued

COATED ABRASIVE

| Abrasive Grain (Ex. No.) | Backing: Abrasive Grade: | Mineral Weights (g/cm²) | | |
|---|---|---|---|---|
| | | "X" Wt. Rayon 100 | "Y" Wt. Cotton 50 | "Y" Wt. Cotton 36 |
| 2 | | 0.038 | — | — |
| 3 | | 0.038 | — | — |
| 4 | | 0.038 | — | — |
| 5 | | 0.034 | — | 0.116 |
| 6 | | 0.034 | — | 0.102 |
| 7 | | 0.036 | 0.072 | 0.108 |
| 8 | | 0.036 | 0.072 | — |
| 9 | | — | — | 0.107 |
| 10 | | 0.038 | — | — |
| 11 | | 0.031 | 0.063 | — |
| 41 | | — | 0.066 | — |
| 12 | | 0.030 | 0.063 | — |
| 21 | | — | 0.066 | — |
| 13 (Control) | | — | — | 0.095 |
| Al₂O₃ (Control) | | 0.030 | 0.063 | 0.092 |
| Make resin coating weight (g/cm²) | | 0.013 | 0.020 | 0.025 |
| Size resin coating weight (g/cm²) | | 0.012 | 0.022 | 0.030 |

TABLE IV

GRINDING CONDITIONS

| | Abrasive Grade | | |
|---|---|---|---|
| | 100 | 50 | 36 |
| Pressure per cm width of workpiece (kg) | 1.8 | 2.5 | 4.3 |
| Belt Speed (m/min) | 2,200 | 2,000 | 2,000 |
| Workpiece (1018 cold rolled steel) Feed Rate (m/min) | 3.6 | 1.8 | 1.8 |
| Cycles | 100 | 50 | 50 |
| End point g/min cut | 20 | 30 | 40 |

EXAMPLE 14

An alumina hydrosol was prepared by dispersing 65 g α-alumina monohydrate ("Dispal" ® M) in a solution of 580 g H₂O and 6.5 g concentrated HCl (35%). Aqueous zirconium diacetate solution (191 g-22% ZrO₂ equivalent) was added to the alumina hydrosol to yield a milky sol which had a pH of 3.5. The resultant dispersion was poured into a heat resistant glass dish (22.9 cm×35.6 cm) and dried in a forced air electric oven at 90° C., gelation occurring after about 15–20 minutes. The gel was divided into two aliquot portions, each of which was placed in a 15.2 cm diameter Petri dish. Part A was dried in a 75° C. oven and Part B was dried at room temperature.

Part A was removed from the oven and found to have broken into relatively coarse irregularly-shaped granules which were predominately larger than about 100 mesh[1] and could be further comminuted with a mortar and pestle. It was cooled to room temperature placed in an alumina crucible, and fired in an electric resistance furnace as follows: room temperature to 475° C. in 45 minutes; 475° C. to 1000° C. in 1.5 hours; and retained at 1000° C. for 45 minutes. The resultant granules were tough and hard.

[1]. Average diameter 150 microns.

Part B, after drying at room temperature, was found to have broken into granules which were larger and more transparent than those of Part A after drying at 75° C. Part B was then subdivided into two aliquot parts, respectively identified hereinafter as Parts B-1 and B-2.

Part B-1 was fired as follows: room temperature to 800° C. in 1¼ hours; 800° C. to 1000° C. in ½ hour; and retained at 1000° C. for 2¼ hours.

Part B-2 was fired as follows: room temperature to 1320° C. in 3½ hours; and retained at 1320° C.-1340° C. for 1 hour.

The fired granules obtained from Part B-1 were almost transparent, hard and tough, and slightly larger than those obtained in Part A.

The fired granules obtained from Part B-2 were white, shiny and opaque, hard and tough. Some of the fired granules were substantially above 100 mesh (average diameter 150 microns) in size.

The composition of all the fired granules was about 42% ZrO₂ and 58% Al₂O₃.

The granules obtained from Part A and Part B-1 were essentially as shown in FIG. 5 and the granules obtained from Part B-2 were essentially as shown in FIG. 6. X-ray diffraction analysis of air-dried gel showed only boehmite structure. Samples fired to 1000° C. showed no discernible α-Al₂O₃ and both monoclinic and tetragonal ZrO₂, predominately the latter. After firing at the higher temperature (1320° C.–1340° C.), the X-ray diffraction pattern showed α-Al₂O₃ and both monoclinic and tetragonal ZrO₂, but predominately monoclinic. Examination with the scanning electron microscope reveals that the microstructure comprises equant ZrO₂ particles in a matrix of Al₂O₃.

EXAMPLES 15–41

Examples 15–39 were prepared using an alumina sol prepared as described in Example 1. The standard batch was 1020 g alumina, 43 ml 16 N nitric acid and 3000 ml water. The remaining ingredients, which are listed in Table V, were introduced as a solution of nitrate salt of the metal ions. The TiO₂ sol (Example 40) was introduced as the acid hydrolysis product of tetrabutylorthotitanate, and the magnesia as magnesium acetate (Example 41). The remainder of the preparations were similar to that of Example 2.

TABLE V

| Ex. No. | 50% Zirconyl Acetate Soln. (g) | Mg(NO$_3$)$_2$ . 6H$_2$O (g) | Other Metal Precursors (g) | Wt. % Al$_2$O$_3$ | Wt. % ZrO$_2$ | Wt. % MgO | Wt. % and Type of Other Metal Oxide |
|---|---|---|---|---|---|---|---|
| 15 | — | 13 | — | 99.75 | — | 0.25 | — |
| 16 | — | 25 | — | 99.5 | — | 0.5 | — |
| 17 | — | 51 | — | 99.0 | — | 1.0 | — |
| 18 | — | 102 | — | 98.0 | — | 2.0 | — |
| 19 | — | 209 | — | 96.0 | — | 4.0 | — |
| 20 | — | 265 | — | 95.0 | — | 5.0 | — |
| 21 | — | 321 | — | 94.0 | — | 6.0 | — |
| 22 | — | 378 | — | 93.0 | — | 7.0 | — |
| 23 | — | 437 | — | 92.0 | — | 8.0 | — |
| 24 | — | 497 | — | 91.0 | — | 9.0 | — |
| 25 | — | 559 | — | 90.0 | — | 10.0 | — |
| 26 | — | 685 | — | 88.0 | — | 12.0 | — |
| 27 | — | 818 | — | 86.0 | — | 14.0 | — |
| 28 | — | 957 | — | 84.0 | — | 16.0 | — |
| 29 | — | 1257 | — | 80.0 | — | 20.0 | — |
| 30 | — | 1676 | — | 75.0 | — | 25.0 | — |
| 31 | — | — | 120 Zn(NO$_3$)$_2$ . 6H$_2$O | 96.0 | — | — | 4 ZnO |
| 32 | — | — | 127 Co(NO$_3$)$_2$ . 6H$_2$O | 96.0 | — | — | 4 CoO |
| 33 | — | — | 127 Ni(NO$_3$)$_2$ . 6H$_2$O | 96.0 | — | — | 4 NiO |
| 34 | 554 | — | — | 85.0 | 15 | — | — |
| 35 | 184 | — | 357 Ni(NO$_3$)$_2$ . 6H$_2$O | 85.0 | 5 | — | 10 NiO |
| 36 | 184 | — | 357 Co(NO$_3$)$_2$ . 6H$_2$O | 85.0 | 5 | — | 10 CoO |
| 37 | 199 | — | 405 Sm(NO$_3$)$_3$ . 6H$_2$O | 79.0 | 5 | — | 16 Sm$_2$O$_3$ |
| 38 | — | 282 | 133 Ce(NO$_3$)$_3$ . 6H$_2$O | 89.0 | — | 5 | 6 CeO$_2$ |
| 39 | — | 270 | 65 Ni(NO$_3$)$_2$ . 6H$_2$O | 93.0 | — | 5 | 2 NiO |
| 40 | — | 276 | 147 Ti(OC$_4$H$_9$)$_4$ | 91.0 | — | 5 | 4 TiO$_2$ |
| 41 | 174 | — | 233 Mg(C$_2$H$_3$O$_2$)$_2$ . 4H$_2$O | 90.0 | 5 | 5 | — |

Table VI tabulates data obtained by X-ray diffraction analyses relating to the compositions of the Examples. "X" denotes the presence of the species noted.

TABLE VI

| Ex. No. | α-Al$_2$O$_3$ | Tetragonal or cubic ZrO$_2$ | Monoclinic ZrO$_2$ | Spinel MgAl$_2$O$_4$ | Other |
|---|---|---|---|---|---|
| 1 | X | X | X | — | — |
| 2 | X | X | X | — | Transitional Alumina |
| 3 | X | X | X | — | — |
| 4 | X | X | X | X | — |
| 5 | X | X | X | — | — |
| 6 | X | X | X | X | — |
| 7 | X | X | X | — | — |
| 8 | X | X | X | X | — |
| 9 | X | X | X | — | — |
| 10 | X | X | X | X | — |
| 11 | X | X | — | X | — |
| 12 | X | — | — | X | — |
| 13 (Control) | X | — | — | — | — |
| 14 | — | — | — | — | — |
| 15 | X | — | — | X | — |
| 16 | X | — | — | X | — |
| 17 | X | — | — | X | — |
| 18 | X | — | — | X | — |
| 19 | X | — | — | X | — |
| 20 | X | — | — | X | — |
| 21 | X | — | — | X | — |
| 22 | X | — | — | X | — |
| 23 | X | — | — | X | — |
| 24 | X | — | — | X | — |
| 25 | X | — | — | X | — |
| 26 | X | — | — | X | — |
| 27 | X | — | — | X | — |
| 28 | X | — | — | X | MgO |
| 29 | X | — | — | X | MgO |
| 30 | X | — | — | X | MgO |
| 31 | X | — | — | — | ZnAl$_2$O$_4$ Spinel |
| 32 | X | — | — | — | CoAl$_2$O$_4$ Spinel |
| 33 | X | — | — | — | NiAl$_2$O$_4$ Spinel |
| 34 | X | X | — | — | — |
| 35 | X | X | — | — | NiAl$_2$O$_4$ Spinel |
| 36 | X | X | — | — | CoAl$_2$O$_4$ Spinel |
| 37 | X | X | — | — | Sm$_2$O$_3$, SmAlO$_3$ Sm$_4$Al$_2$O$_9$ |
| 38 | X | — | — | X | CeO$_2$ |
| 39 | X | — | — | X | NiAl$_2$O$_4$ + MgNiO$_3$ |
| 40 | X | — | — | X | MgTi$_2$O$_4$ + Mg$_2$TiO$_4$ |

ABRASIVE DISC TEST

The mineral from several of the examples was used to make 17.75 cm (7-inch) diameter coated abrasive discs. The minerals for all the discs were 1:1 by weight mixture of 45–50 mesh (average diameter 325 microns) and 50–60 mesh (average diameter 450 microns) screen cuts obtained using U.S. Standard Screens. The discs were prepared using conventional coated abrasive making procedures, conventional 0.76 mm vulcanized fiber backings and conventional calcium carbonate-filled phenolic resin make and size resins, without adjusting for mineral density differences. The make resin was precured for 75 minutes at 88° C. The size resin was precured for 90 minutes at 88° C. followed by a final cure of 100° C. for 10 hours. The coating was done using conventional techniques in a one-trip operation with curing in a forced air oven. The coating weights (wet basis) were as follows: make 0.013 g/cm$^2$; size, 0.025 g/cm$^2$; and mineral, 0.0534 g/cm$^2$.

The cured discs were first conventionally flexed to controllably crack the hard bonding resins, mounted on a beveled aluminum back-up pad, and used to grind the face of a 1.25-cm × 30-cm 1018 cold rolled steel workpiece. The disc was driven at 5000 rpm while the portion of the disc overlying the beveled edge of the back-up pad contacted the workpiece at a pressure of 0.5 kg/cm$^2$, generating a disc wear path of about 140 cm$^2$. Each disc was used to grind 8 separate workpieces for 1 minute each. The cumulative cut for each disc is tabulated in Table VII.

TABLE VII

| Example | Cumulative Cut (cm$^3$ Steel/cm$^2$ coated abrasive wear path) |
|---|---|
| 13 (Control, 100% non-fused α-alumina) | 0.010 |
| 15 | 0.029 |
| 16 | 0.055 |
| 17 | 0.075 |
| 12 | 0.096 |
| 18 | 0.098 |
| 19 | 0.132 |
| 20 | 0.100 |
| 21 | 0.140 |
| 22 | 0.143 |
| 23 | 0.125 |
| 24 | 0.124 |
| 25 | 0.108 |
| 26 | 0.103 |
| 27 | 0.081 |
| 28 | 0.079 |
| 29 | 0.065 |
| 30 | 0.042 |
| 31 | 0.112 |
| 32 | 0.070 |
| 33 | 0.095 |
| 34 | 0.038 |
| 35 | 0.067 |
| 36 | 0.050 |
| 37 | 0.071 |
| 11 | 0.099 |
| 38 | 0.068 |
| 39 | 0.041 |
| 40 | 0.082 |
| Fused Al$_2$O$_3$ Control | 0.068 |
| Co-Fused Alumina-Zirconia Control | 0.101 |

EXAMPLE 42

A lofty, non-woven abrasive product was prepared by adhering mineral granules according to the present invention throughout a lofty non-woven web. A 20-mm thick air-laid 270 g/m$^2$ non-woven web was prepared from 5-cm crimped 58-denier nylon fibers (equal parts by weight of nylon 6 and nylon-6,6) using a "Rando-Webber" web-forming apparatus. The non-woven web was needle-tacked into a 150 g/m$^2$ plain square weave mesh scrim having 16 threads per 2.5 cm in the machine and transverse direction and a total denier of 840 per thread (the scrim being commercially available from the Burlington Industrial Fabrics Company) by using a felting machine having a needle board fitted with rows of 15 × 18 × 25 × 3.5 RB needles (commercially available from the Torrington Company) spaced 10 mm between rows and 12 mm between needles. The web was needled at 440 punches per minute with a 14-mm penetration depth while advancing the combined web and scrim at the rate of 6 m per minute to provide a non-woven fiber distribution of about 80% above the scrim and 20% below.

The needled web was bonded by roll coating with a composition consisting of 63.3 parts by weight ketoximeblocked poly-1,4-butylene glycol diisocyanate having a molecular weight of about 1500 (commercially available from E. I. DuPont de Nemours and Co., Inc. under the trade designation "Adiprene" BL-16), 21.8 parts of a 35% solution of methylene dianiline in hydroxyethyl acetate, 14.9 parts xylol and about 0.01 part anti-foam agent (sold under the trade designation "Dow" Anti-Foam A). The solvent was evaporated and the coating was cured in an oven at 160° C. for 8 minutes to provide a dry coating weight of 315 g/m$^2$. The web was then roll coated with 270 g/m$^2$ (solids basis) of an adhesive coating composition consisting of:

| Ingredients | Parts |
|---|---|
| Polymethylene polyphenylisocyanate, commercially available from Mobay Chemical Co. under the trade designation "Mondur" MRS | 68.0 |
| Polypropylene glycol having an average molecular weight of about 1000 (hydroxyl number about 112) | 25.0 |
| Stannous Octoate | 0.055 |
| Encapsulated catalyst containing 16% potassium lactate, 5% glycerol in 79% benzoyl chloride catalyzed polymerized "Mondur" MRS resin (the encapsulated catalyst being described in U.S. Pat. No. 3,860,565) | 7.0 |

Non-fused abrasive granules prepared as Example 11 and having an average diameter of about 325 microns were drop-coated on the top surface of the coated web to provide a mineral coating weight of 860 g/m$^2$ and the make coating cured for 5 minutes at 105° C. The granule-coated web was then roll coated with a size consisting of the adhesive coating composition described above and cured for 5 minutes at 105° C. to provide a dry size coating weight of 300 g/m$^2$.

EXAMPLES 43–46

Examples 43–46 refer to additional lofty non-woven abrasive products which were prepared using the lofty non-woven web, bonding and coating compositions, granule particle size, and procedures described in Example 42, with the following differences:

The abrasive granules used in Example 43 were prepared as Example 12. The abrasive granules of Examples 44–46 were blends of the non-fused mineral described in Example 12 and fused alumina, a conventional abrasive, in the proportions by weight described in Table VIII, which also sets forth the mineral and size adhesive coating weights.

TABLE VIII

| Ex. | Non-fused Abrasive (%) | Fused Al₂O₃ (%) | Mineral (g/m²) | Size Coat (g/m²) |
|---|---|---|---|---|
| 43 | 100 | — | 880 | 300 |
| 44 | 80 | 20 | 670 | 270 |
| 45 | 50 | 50 | 940 | 315 |
| 46 | 20 | 80 | 910 | 305 |

Each of the products described in Examples 42–46 was cut into a 180-mm diameter disc and mounted on a 28-mm diameter rubber support drive pad which was driven at 3450 rpm. Under a force of 4 kg, the face of the disc was brought in contact at a 14° angle with a 400-mm square workpiece of 1.24 mm 1018 cold rolled steel at a point 135 mm from the center of the piece. The workpiece was rotated about its center at 4 rpm. The workpiece was weighed initially and after each of eight 2-minute periods of abrasion. Results are tabulated below.

TABLE IX

STEEL REMOVED, GRAMS
TEST PERIOD NO.

| Ex. No. | 1 | 2 | 3 | 4 | 5 | 6 | 7 | 8 | Total |
|---|---|---|---|---|---|---|---|---|---|
| 42 | 7.3 | 5.7 | 4.2 | 2.7 | 1.3 | 1.8 | 0.9 | 0.7 | 24.6 |
| 43 | 8.0 | 5.9 | 5.6 | 5.4 | 4.0 | 3.3 | 2.2 | 1.2 | 35.6 |
| 44 | 5.8 | 5.4 | 4.2 | 2.8 | 2.1 | 1.5 | 2.4 | 1.5 | 25.7 |
| 45 | 3.8 | 2.4 | 2.3 | 2.1 | 1.3 | 1.7 | 1.1 | 0.7 | 15.4 |
| 46 | 3.2 | 1.4 | 1.1 | 1.1 | 2.0 | 1.7 | 1.2 | 1.3 | 13.0 |

It is apparent from the test results shown in Table IX that those non-woven abrasive products containing all or substantial amounts of non-fused mineral removed much more stock during the first few 2-minute runs, and removed a greater amount of stock for the entire 8 runs, than abrasive products containing 50% or more fused alumina. Fused alumina usually outperforms fused alumina: zirconia in this test.

EXAMPLE 47

Abrasive grinding wheels were prepared by conventional cold molding techniques to produce grinding, cut-off and cup abrasive wheels, using both fused alumina abrasive grain as a control and non-fused abrasive grain according to Example 11 of the present invention. The abrasive wheels made with the mineral of the non-fused abrasive grain of the invention performed at least as well as the control wheels made with fused alumina.

The grinding wheels were 25 cm in diameter, 2.5 cm thick and had a central opening of 7.6 cm. They were prepared by first wetting 4540 grams of grade 50 (430 micron average diameter) abrasive grain in a conventional dough mixer with 150 grams liquid phenolic resin, placing the wetted mineral in a cement mixer with 450 grams dry phenolic resin and 90 grams cryolite and thoroughly mixing. A 3030-gram portion of the resultant mixture was evenly distributed in a conventional grinding wheel mold and compacted to the appropriate size by pressing with a hydraulic press for 15–20 seconds. The pressed compact was removed from the mold, heated at 91° C. for 8 hours and final-cured by heating at 180° C. for 60 hours. The grinding wheels were then finished and balanced in a conventional manner.

The grinding wheels were evaluated under equivalent conditions by grinding a 1.3-cm×30-cm 1018 cold rolled stress-relieved steel workpiece at a grinding depth of 25 microns and feed rate of 16 meters per minute to provide a cut rate of 4 cm³ per minute per cm with a grinding wheel speed of 1680 meters per minute. The specific energy and coefficient of friction were monitored for 500 grinding cycles. Thereafter volume loss of the wheel and of the workpiece was measured to determine the grinding ratio (workpiece volume loss divided by wheel volume loss).

The grinding results were as follows:

| | Fused Alumina | Non-fused Alumina |
|---|---|---|
| Grinding ratio | 3.9 | 7.3 |
| Average specific energy (watt-hrs/cm³) | 5.3 | 4.3 |
| Average coefficient of friction | 0.57 | 0.54 |

It will be noted that the abrasive wheel having non-fused mineral of the invention had a grinding ratio more than 85% higher than the wheel having fused mineral and the former required substantially less energy during grinding than the latter.

We claim:

1. Method of making dense, synthetic, aluminum oxide-based granular abrasive mineral having a substantially homogeneous microcrystalline structure of randomly oriented crystallites comprising modifying component in a dominant continuous alumina phase comprising alpha-alumina, said
   (a) gelling a substantially calcium ion- and alkali metal ion-free homogeneous mixture of an alumina source compound and at least one precursor of at least one modifying component selected from
      (i) zirconia, hafnia, or a combination of zirconia and hafnia, and
      (ii) a spinel derived from alumina and at least one oxide of a metal selected from cobalt, nickel, zinc, or magnesium,
   said precursor being present in an amount to provide in said mineral a dominant continuous alumina phase comprising alpha-alumina and a modifying component content, on a volume percent of fired solids of the mineral, of either (a) at least 10% of said (i), (b), at least 1% of said (ii), or (c) at least 1% of said (ii) and 1–45% of said (i),
   (b) drying the gelled mixture to form chunky pieces of solid material, and
   (c) firing said solid material in a non-reducing atmosphere to a temperature of at least 1250° C., but not above the melting point of said mineral, to remove fugitive materials and to nondestructively convert said solid material to a dense aluminum oxide-based mineral.

2. The method of claim 1 further including, prior to the firing step, the step of crushing the solid material to produce a desired particle size.

3. The method of claim 1, further including the step of crushing said dense α-aluminum oxide-based mineral to produce a desired particle size.

4. The method of claim 1 wherein said precursor is a precursor of zirconia.

5. The method of claim 4 wherein said precursor is an alkanate.

6. The method of claim 5 wherein said alkanate is the acetate or formate.

7. The method of claim 1 wherein said metal is magnesium.

8. The method of claim 1 wherein said metal is zinc.

9. The method of claim 1 wherein said precursor is magnesium acetate, chloride, or nitrate.

10. The method of claim 1 wherein said precursor is a precursor of zirconia and of magnesium aluminum spinel.

11. The method of claim 1 wherein said firing is effected in a kiln having means for moving said solid material during firing.

12. The method of claim 11 wherein said kiln is a rotary kiln.

13. The method of claim 1 wherein said non-reducing atmosphere is an oxidizing atmosphere.

14. Substantially calcium ion- and alkali metal ion-free, dense, non-fused synthetic, aluminum oxide-based granular abrasive mineral, having a substantially homogeneous microcrystalline structure comprising a secondary phase of randomly oriented crystallites comprising modifying component in a dominant continuous alumina phase comprising alpha-alumina, said modifying component, on a volume percent of fired solids of the mineral, being selected from:
(i) at least 10% of zirconia, hafnia, or a combination of zirconia and hafnia,
(ii) at least 1% of a spinel derived from alumina and at least one oxide of a metal selected from cobalt, nickel, zinc, or magnesium, or
(iii) 1–45% of said zirconia, hafnia, or the combination of zirconia and hafnia and at least 1% of said spinel.

15. The mineral of claim 14 wherein said secondary phase comprises spinel formed from magnesia and alumina.

16. The mineral of claim 14 wherein said secondary phase comprises zirconia.

17. The mineral of claim 14 wherein said secondary phase comprises a spinel formed from zinc oxide and alumina.

18. The mineral of claim 14 wherein said secondary phase comprises zirconia crystallites having diameters less than about 2500 Angstroms and said $\alpha$-alumina phase comprises $\alpha$-alumina crystallites having diameters less than about 3000 Angstroms.

19. The mineral of claim 14 having conchoidal fractures.

20. The mineral of claim 14 wherein said secondary phase comprises zirconia and samaria.

21. The mineral of claim 14 characterized by being transparent to visible light.

22. The mineral of claim 14 wherein said secondary phase comprises spinel formed by alumina and magnesia and another metal oxide selected from the group consisting of titania, ceria, zirconia and combinations thereof.

* * * * *